June 25, 1946.　　　S. KRASNOW ET AL　　　2,402,638
MAGNETIC COMPASS
Filed Sept. 4, 1941　　　2 Sheets-Sheet 2
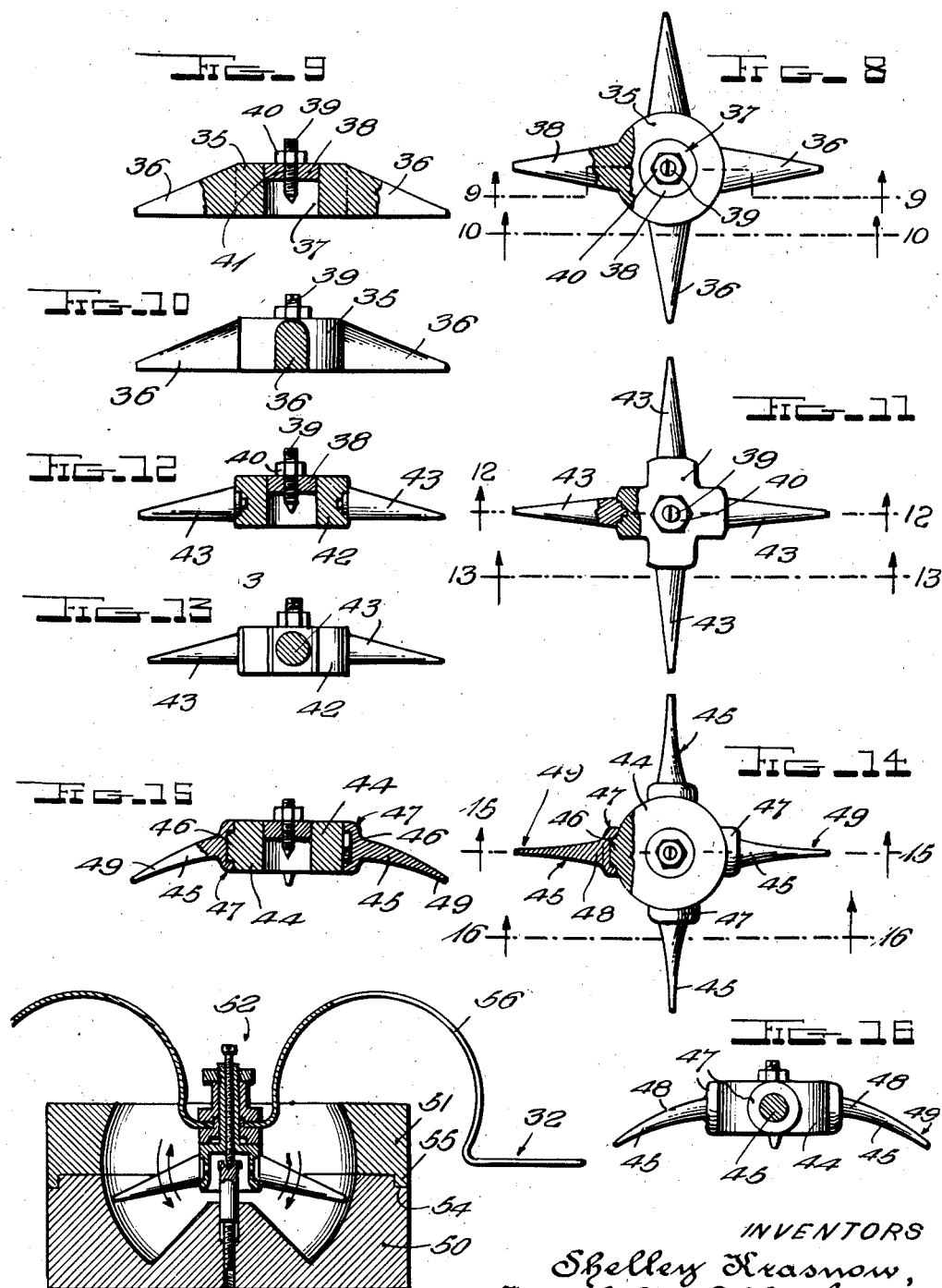
INVENTORS
Shelley Krasnow,
Joseph M. S. Kaufman,
BY Shelley Krasnow
ATTORNEY Patented June 25, 1946

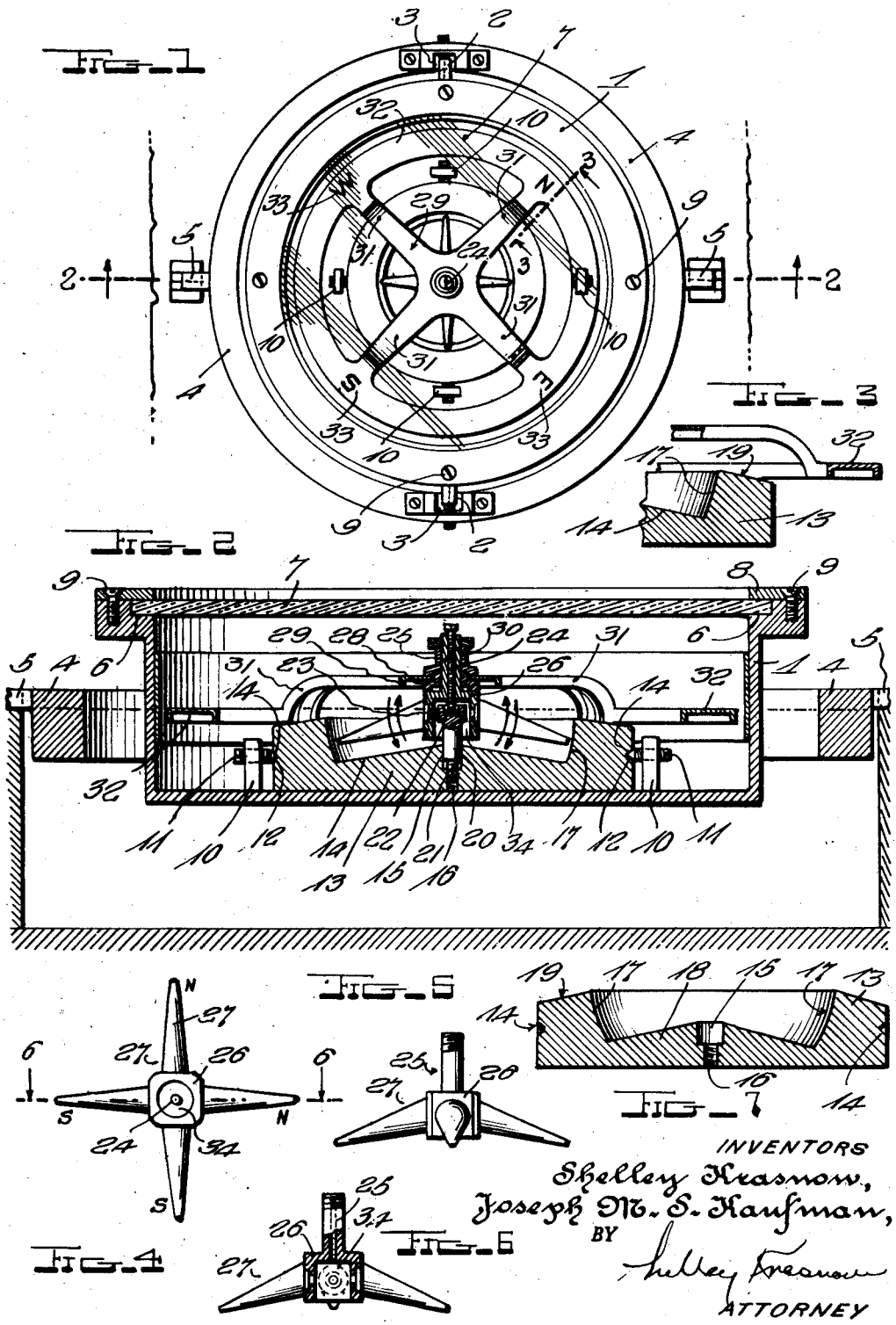

2,402,638

UNITED STATES PATENT OFFICE 2,402,638

MAGNETIC COMPASS

Shelley Krasnow, New York, N. Y., and Joseph M. S. Kaufman, Washington, D. C.

Application September 4, 1941, Serial No. 409,574

6 Claims. (Cl. 33—222)

This invention relates to a new type of magnetic compass, useful for indicating the direction of the magnetic meridian. In the specific form described, the instrument is particularly suitable for the steering of boats, ships, airplanes, tanks, and other vehicles. In the prior art, it had been customary to make such compasses of the liquid immersed type. The moving system in these compasses would be entirely immersed in a liquid which in some cases was a light oil, in other cases a mixture of alcohol and water. Experience extending back over many years indicates that such compasses are quite undesirable. The use of liquid requires a liquid-tight container, which is simple enough in theory but difficult to obtain in practice. Moreover liquid will generally have corrosive effects. Even normally non-corrosive liquids will often decompose under the action of light and heat and will give end products which will cause corrosion. Furthermore, leakage or removal of the liquid from the container would often subject the instrument to highly undesirable conditions, such as abnormally high pivot loads. Furthermore, a fluid immersed compass cannot be shipped in disassembled condition, since it requires an instrument maker or someone of equal skill to assemble it. On the other hand, compasses employing no liquid may be shipped in disassembled condition and the moving system put in place very easily before the instrument is to be used, or after it is finally mounted. Thus the shocks caused by transportation, which are often far greater than those caused by ordinary use, will be avoided.

The undesirable features of liquid have long been recognized, but they have been accepted as necessary evils. In some cases the liquid has been thought desirable in order to buoy, or partially float, the moving system of the compass. The thought behind this was to remove as much as possible of the weight upon the pivot and thus make the instrument more sensitive, and prolong the life of the pivot. When this construction was adopted, a float was normally used and this gave rise to further trouble. An awkward type of design had to be used to have the center of buoyancy of the float in the right position. Furthermore, the float often developed leaks, rendering the instrument entirely inoperative. Moreover, the pivot of such an instrument would often be subjected to dangerous loads. Even though the weight had largely been lifted off the pivot, the moving system would still be responsive to acceleration and the accelerational forces would be dependent upon the mass of the moving system rather than its weight. Thus, even though the load on the pivot was theoretically very light, actually, due to vibration and acceleration, considerable forces would be set up in the moving system and transmitted to the pivot.

Liquid has also been tolerated in the belief that it is necessary for damping. Use of liquid has been indicative of a virtual confession that other systems of damping were not successful.

Although magnetically damped compasses have been described in the prior art, they have not been particularly successful. For one thing, the damping had not been sufficient, the result of this being that the compass would continue to swing to and fro when subjected to external disturbances. Furthermore, the damping was not uniform and symmetrical, resulting in a certain type of oscillation being quite undamped, while another type would be relatively effectively damped. This resulted in a sort of "loping" behavior. A still further defect was that the compass had to be formed in the shape of a sphere, and to have a dome-shaped top. This type is somewhat awkward to use when it is desired to view the compass from above as is often the case in the navigation of water craft. For the latter purpose, it is highly desirable to have an instrument of generally flat form, with a flattened top. It is further desirable to have the card or indicating member in the form of a dial of generally flat shape to be viewed from above. The compass shown herein combines the advantages of magnetic damping of compasses shown in the prior art, at the same time allowing a construction which permits the use of a flattened form of card and container.

The present invention is intended to supply a new type of magnetic compass, which is entirely independent of fluid of the type of liquid, and which has an efficiently damped system, entirely obviating the need for fluid. Moreover, by making the system light, and by other improved design it has been found possible to reduce the pivot load to such a degree that fluid is unnecessary to avoid undue load on the pivot.

It is an object of the invention to provide a new type of magnetic compass, with an efficient magnetic damping system.

It is a further object of the invention to supply a dry magnetic compass with balanced damping about any horizontal axis.

It is a further object of the invention to supply a magnetic compass with a light magnetic system.

It is a further object of the invention to supply a magnet system which is dynamically balanced.

It is a further object of the invention to supply a magnet system with a very low moment of inertia compared to its magnetic moment.

It is a further object of the invention to supply a magnetic compass which is very rapid in operation and which can be made critically damped, or overdamped.

It is a further object of the invention to provide a compass which will be especially resistant to lateral oscillation.

It is a further object of the invention to provide an efficient magnetically damped compass of flat form.

It is a further object of the invention to provide an efficient magnetic unit with a minimum leakage and minimum moment of inertia.

It is another object of the invention to provide a magnet system with a high order of symmetry.

It is a further object of the invention to provide a magnet system with the center of gravity at a desired height.

It is a further object of the invention to provide a magnet system of materials of different coercive forces and different permeabilities, so as to make most effective use of the magnetic material and to obtain a high magnetic moment relative to the weight, and relative to the moment of inertia of the moving system.

It is a further object of the invention to provide a magnetic element which has radially projecting poles, so that prolongations of these poles will pass through the vertical axis of the system.

It is a further object of the invention to provide means to be attached to the moving system of a compass, the means serving to increase the moment of inertia about a horizontal axis, with relatively little increase of moment of inertia about a vertical axis.

Although a specific type of magnetic compass has been shown, it will be obvious that the methods and advantages of the invention may be gained in other instruments having similar construction and used for related purposes.

The advantages of the present invention are gained by a design which follows new lines. A principle employed is that of using an absolutely symmetrical magnetic system. Prior art instruments have used magnetic systems which had poles extending in one direction. In the present compass, by the use of four poles arranged in the form of a cross, a system is obtained which is mechanically symmetrical and therefore relatively resistant to mechanical disturbances. By the use of such a system, the heaviest part of the instrument is concentrated at the central point or close thereto, this point being the one about which rotation takes place. In view of the fact that the moment of inertia of a mass is proportional to the square of its distance from the point of rotation, the more mass that can be concentrated near the center of rotation, the better. It is obvious that some sort of hub arrangement must be provided for any compass. By making the hub serve several functions, the dead weight carried by the pivot on which the moving system rests, can be reduced and the moment of inertia reduced. The invention also involves the use of tapered members extending radially from the hub. The tapered form serves two important functions. First, it will be realized that since magnetic lines of force leak from the surface of the magnet throughout its entire length, the material near the ends of the magnet will actually carry less flux than the material near the center. Less area will therefore be required at the terminal portions. By reducing the cross-sectional area toward the terminal portions, a magnet is obtained which is unusually efficient for its weight, and which further has an especially low moment of inertia. The form employed for each of the prongs or arms of the magnet may be roughly conical. For the same weight of material, a cone rotated about a transverse axis through its base will have a lower moment of inertia than a cylinder rotated about a transverse axis through its base. This is readily evident when one considers that the lightest part of the cone is furthest from the axis of rotation. Since the moment of inertia is proportional to the square of the distance of a weight from the axis of rotation, the intrinsic low moment of inertia of the cone will be readily appreciated. Since the period of oscillation of the compass is proportional to $$\sqrt{\frac{I}{M}}$$

where M is the magnetic moment and I is the moment of inertia, it will be seen that the form described will give a shorter period of oscillation in a uniform magnetic field, such as the earth's field.

But still greater advantages are obtained in the matter of damping. The four radially projecting prongs mounted in a conducting cup which fits closely thereabout, present four highly concentrated bundles of magnetic lines of force, which, moving in close proximity to the conducting material, induce currents therein which tend to damp oscillations, whether about the vertical axis of the instrument or about any horizontal axis. In view of the symmetry of the system, balanced damping will be obtained. If only a single magnet were used, as is contemplated in the prior art, a lateral oscillation taking place about a horizontal axis passing through the magnet would not be damped at all, while an oscillation about an axis at right angles to the axis of the magnet would be damped efficiently. In the present system, the damping will be effective whether the oscillation is about the axis of one magnet or the other since the magnets are exactly similar and will behave in the same way. From this it can be seen that the damping about any horizontal axis will be the same as that for any other horizontal axis and perturbations of the system will be efficiently damped, no matter what their direction.

Because of the exceptionally good damping obtained, the center of gravity of the magnet system may be left rather high, since little restoring force is needed to bring it to a level position. By making this change, the magnet system can be made relatively unresponsive to lateral accelerations.

A further principle involved is that of making the card of as low moment of inertia as possible. This is accomplished by using an especially light card structure. It is possible, in fact, to make the card and magnet structure so light, that the total load on the pivot will be little greater than the load in a fluid immersed compass employing a float.

By the use of the principles enunciated above and the construction described herein, it has been possible to obtain compasses which are critically damped. It is possible to overdamp the instrument, but this is generally not desirable. As a matter of fact, the most desirable condition has been found to be one where the instrument is slightly underdamped. With this construction, it will overswing slightly and return to its proper position.

By the use of the principles enunciated above and the construction described herein it has been found possible to obtain a compass which has a period of oscillation of four seconds, using a four inch card. A conventional compass using liquid and having the same size card was found to have a period of oscillation of 20 seconds. The importance of the short period of oscillation in rapidly moving craft and small craft operating in a rough sea can be well appreciated.

A further advantage obtained with the system described is that since liquid can be obviated, materials may be used in construction which would be entirely unsuitable for immersion in liquid. Thus, an ordinary paper dial may be used, or one of a plastic. Luminous paint may further be employed in both the moving system and the stationary index marks, without any necessity of protecting the luminous paint against destruction by the liquid. A further advantage is that a mechanical arresting system, similar to that used in surveying instruments, may be utilized to lift the entire moving system off its pivot when not in use. Thus, advantage may be taken of a type of construction which is impracticable in a fluid filled compass.

Other objects and advantages of the invention will be apparent from the detailed description taken in conjunction with the drawings, in which:

Figure 1 shows a plan view of a compass made according to the invention.

Figure 2 shows a lateral cross-sectional view of the compass shown in Figure 1, taken across the plane 2—2.

Figure 3 shows a partial lateral cross-sectional view taken across the plane 3—3.

Figure 4 shows a bottom view of a typical magnet system employed in the compass.

Figure 5 shows a lateral view of the system shown in Figure 4.

Figure 6 shows a partial lateral cross-sectional view taken across the plane 6—6 of Figure 4.

Figure 7 shows a lateral cross-sectional view of the damping cup.

Figure 8 shows a view of an alternative magnet system, made in one piece.

Figure 9 shows a partial cross-sectional view taken across the plane 9—9 of Figure 8.

Figure 10 shows a partial lateral cross-sectional view taken across the plane 10—10 of Figure 8, showing the detail of one of the arms.

Figure 11 shows a top view with a portion in section of a composite magnet system.

Figure 12 shows the magnet system shown in Figure 11, in partial lateral cross-sectional view, taken across the plane 12—12.

Figure 13 shows a lateral cross-sectional view of one of the arms of the magnet shown in Figure 11, taken across the plane 13—13.

Figure 14 shows still another composite magnet system, giving a top view and a partial lateral cross-sectional view.

Figure 15 shows a cross-sectional view of the magnet shown in Figure 14, taken across the plane 15—15.

Figure 16 shows a partial cross-sectional view of the magnet shown in Figure 14, taken across the plane 16—16.

Figure 17 shows a lateral cross-sectional view of an alternative type of construction, similar to that shown in Figure 2.

1 represents the casing or bowl of a compass. To this are attached knife edges 2, 2, resting in seats 3, 3. The seats 3, 3, for the knife edges are mounted in a gimbal ring 4, which in turn is provided with knife edges 5, 5. These rest in seats in a stationary support. At the upper part of casing 1 is a recessed portion 6, in which is fitted a transparent cover 7. This is held in place by a retaining ring 8, which is in turn held in place by screws or other fastening means 9. Fastened rigidly to the interior of the casing 1 are a number of upright portions 10. These may be three, four, or more in number. The uprights 10 are provided with threaded holes into which are placed adjusting screws 11, provided with pointed ends 12. A massive damping cup 13 is mounted within the projections, and is provided with conical depressions 14, into which the pointed ends of the screws 11 fit. The damping cup 13 is preferably made of some material having a high electrical conductivity. A suitable material for this purpose is copper of high purity, such as the commercial electrical grade. Other suitable materials are silver or aluminum. The central portion of the cup 13 is provided with a cylindrical hole 15. At the lower part of this is a reduced hole 16, which is threaded. The interior portion of the cup is provided with a spherical surface 17, whose purpose will be hereinafter described. The lower part of the cup is made preferably conical in shape as represented by portion 18. The purpose of this will also be described hereinafter. The upper portion of the cup has a rim portion 19 which slants outwardly. This is part of a cone, whose apex lies upon the central axis of the cup. The cup is cylindrical in form on its exterior, and is generally provided with a flat bottom. Mounted centrally in the cup 13 is a member 20 having a cylindrical exterior, and a reduced threaded portion 21. This member fits closely into hole 16 in cup 13, and screws into threaded portion 16. It is therefore restrained from wobbling laterally, and at the same time is adjustable vertically by virtue of the threaded portion 21 engaging with the threaded hole 16. At the upper part of member 20 is a cup-shaped portion 23, in which fits a bearing 22. The bearing 22 may be of a suitable hard material, and is preferably made of sapphire, with a small spherical indentation polished therein. Resting in cup 22 is a threaded member 24 made in the form of a screw with a slotted head, and a sharp point. A high carbon steel may be used for this purpose, with a suitably hard point engaging with jewel 22 so as to give a relatively frictionless bearing. The pivot 24 is engaged in a threaded hole in a vertical upstanding portion 25. The portion 25 is integral with the portion 26, constituting a central hub member. Into the member 26 is fastened by means hereinafter described magnetic elements 27. A collar 28 rests on top of hub member 26. Above collar 28 is the central portion of a dial assembly. This central portion is designated as 29, and is retained in place by a superimposed member 30.

Member 30 is provided with a cylindrical central hole, the end portion of which is threaded internally. The external end portion is slightly enlarged and is preferably provided with a knurled surface. The threaded portion engages with the threaded end of the vertical upstanding portion 25. Thus, the superimposed member 30 may be removed by unscrewing. It may also be loosened to permit the card member to be oriented properly relative to the magnet system, after which it may be tightened. Extending radially from central portion 29 are several arms, which may be four in number and which are represented as 31. These arms carry a dial member 32, which is provided with indicia, graduations or numbers, as desired. These indicia represented as 33, may either be applied by printing or may be cut entirely through the material of the dial 32, permitting light to enter from below. The latter structure is preferred in some cases since it removes weight from the exterior of the dial, where the moment of inertia is greatest. It will be noted that the arms 31 are bent in such fashion as to clear the cup 13, and it will further be noted that the conical portion 19 of the cup 13 is so shaped as to avoid interference with the motion of the card 32, when the latter is not in horizontal position. In order to avoid difficulties which are sometimes met with under severe shaking of the compass in service, the point of the pivot 24, the plane of the card 32, the bottom of the knife edges 2, and the bottom of the knife edges 5 all lie in one plane.

Several modes of construction are possible for the central portion and the magnets 27, and these modifications are shown in the various drawings. A typical form is shown in Figure 4. Here a central portion 26 is provided with radially projecting arms 27. The pivot 24 projects through the central part of 26, and a cup-shaped portion 34 is provided. This cup-shaped portion is so designed that a limited clearance is left between it and the cup 23 of member 20. This prevents displacement of the card and associated portions from their mounting under violent motion. A suitable material is soft iron, Permalloy, or soft steel. Attached to the central portion 26 are magnets 27, which may be made of chromium, tungsten, or cobalt magnet steel. They are, however, made preferably of a magnet material of the type of Alnico. After assembly, the magnets are magnetized in place, with the polarities as shown in Figure 4. The resultant magnetic axis of the combination will lie midway between the two north poles, passing through the center of the system. It will be noted that the magnets are bent downwardly, as shown more clearly in Figure 5. The purpose of this is to aid in lowering the center of gravity of the moving system. If portions of the moving system are above the point of support at 22, the system will be unstable mechanically unless weight can be added below. This is done by having the prongs 27, 27 project downwardly. The members 27, are provided with a shoulder portion, which fits into a recess in member 26. Since the permeability of soft iron or Permalloy is very high compared to most permanent magnet materials, only a small cross-sectional area need be used for the portions 26. The area need be small compared to the area of the Alnico, a magnet material which has a relatively low permeability. The magnetic element mounted centrally in the cup is so mounted that the terminal portions of the magnet 27, almost touch the spherical surface 17 of the damping cup. The closer these terminal portions can be brought to the damping cup, the better the damping action will be. The portion 17 is made a portion of a sphere having its center at the end of the pivot 24, this being the point about which the moving system rotates. The conical portion 18 is provided with such a slope that the magnet in its extreme position under disturbance will lie along the bottom portion 18. Preferably, the card 32 should be so placed relative to the transparent cover 7, that the rim of the card will touch the cover 7 before the magnets touch the bottom 18 of the damping cup 13. The height of the member 24, should be such that there is a small clearance between it and the transparent cover 7. This clearance should be so small that if the moving system is accidentally removed from its support by extreme shaking or vibration, it will fall back again into the cavity in bearing 22, without the possibility of falling out of this bearing entirely.

Various modifications of the magnet system are possible. One is shown in Figures 8, 9 and 10. Here a central portion 35 is made integral with arms 36. A central cored hole 37 is provided into which is pressed a metal disk 38. This is provided with a threaded hole 41, into which is placed a threaded pivot member 39. This is locked in place by lock nut 40. It is understood that the insert 38 may be made in the shape of the upper portion of the member 26, previously described. The entire assemblage of central portion 35 and arms 36 may be cast of Alnico, or other magnet material. This form is especially suitable for this material because of the difficulty of its machining. It may be cast in one piece and used in the rough state, and only need be ground where extreme roughness is encountered, or to remove asymmetries and to balance the element. For ease in molding and casting, the bottom portion of the member 35 and of the arms thereof, may be made flat as shown in Figure 10. The flat portion of the bottom permits especially easy molding. The upper portion is provided with a rounded surface. In general, it may be said that arms such as 27 or 36 should be of circular cross section. It has been found that a circular cross section will give the minimum surface for a given shape. However, in the case of the element shown in Figure 9, the circular section has been abandoned in the interest of easier molding. Here the flat portion, while it presents a theoretically greater surface, exists for only a portion of the contour, and will therefore introduce comparatively little extra leakage.

It will be noted that the portion 35, particularly as shown in Figure 8, is made heavier than the corresponding member 26 shown in Figure 5. The reason for this is twofold. Portion 26 has to carry only magnetic flux while the portion 35 as shown in Figure 8, actually serves to furnish magnetomotive force. In addition, since it is of material having a lower permeability than that of the soft iron used in member 26, it has to be made heavier. However, the moment of inertia added by member 35 being in thickened form as shown, is relatively small, since this portion is near the center of rotation. A suitable set of proportions for the arms 26 and 36 respectively is: length approximately three times the greatest lateral dimension at the base thereof. Other dimensions may be used, a shorter one having been found desirable in many cases. This is particularly true of the element shown in Fig. 9. In fact, the arms 36 can be made extremely short, making the member almost that of a complete ring with short projections.

Another modification shown in Figures 11, 12 and 13 is one in which the central piece 42 is made of magnetic material such as Alnico. While Alnico has been found preferable to most other magnet materials, such materials as cobalt magnet steel, tungsten magnet steel, and chromium magnet steel may be employed. The members 43 are made of some material having a high permeability, such as soft iron or Permalloy. Further modification of this is shown in Figures 14, 15 and 16, where the design has been modified to take advantage of the properties of each of the materials in a most efficient way. Here a central portion 44 made of a magnet material which is preferably of the type of Alnico, is provided with cylindrical projections 46. Members 45, preferably made of soft iron, Permalloy, or other highly permeable material, are provided with a recess corresponding to projection 46, the said recess being forced upon the projection 46 so as to hold the element 45 in rigid relationship to the central member 44. An enlarged portion 47 is provided to carry the magnetic flux efficiently from member 44. This is rapidly reduced to the dimension of the portion shown at 48. Since the iron has a much higher permeability than a magnet material of the type of Alnico, only a relatively small area is required in the portion 48 to carry the flux provided by an area such as seen at the portion 47. The member 45 then tapers downwardly near the terminal portion 49. In this modification, while a length of the member 45, equal to approximately three times the greatest lateral dimension is useful, it has been found that much greater lengths are sometimes desirable.

In some cases, the angle of swing allowed by the type of compass shown in Figure 2 is insufficient. In other cases, when the magnets are almost out of the damping cup, as occurs with violent shaking, the damping is insufficient. For either of these cases, the modification shown in Figure 17 is suitable. Here the damping cup is made of two portions, 50 and 51 respectively. Both are made of material of high electrical conductivity. The cup 50 is provided with a recessed portion 54, which is engaged by a circumferential shoulder 55, provided on the upper member 51. The card assembly 52 is assembled on the central hub after the member 51 has been placed between the magnets and the card assembly. The magnet system with its pivot is then put in place, and the cup lowered so that the portions 54 and 55 engage. It will be noticed that the supporting members 56 are bent in arcuate form. The purpose of this is to allow the member to clear the portion 51. As before, the card 32 is preferably in the same plane as the pivot.

The moving system of the compass may be made of very thin aluminum sheet formed with downwardly projecting portions. This will give stiffness and at the same time furnish a very light moving system. As stated previously, it is of the greatest importance to have the indicating member or card as light as possible, and of as low moment of inertia as possible. Sheet aluminum as thin as 4/1000 of an inch has been found suitable for making this member when the outer diameter is four inches. Thin sheet magnesium or magnesium alloy of the type of Dowmetal, or alloys of magnesium and aluminum, or beryllium, or beryllium alloys may successfully be utilized for the moving member. Alternatively, a plastic may be used, a suitable one being a vinyl resin. This may be used in thin sheet form, and the overhanging portions of both the dial and the arms thereof being fashioned. An alternative structure which has been found suitable for the card assembly and the arms supporting this assembly, is to have the arms 31 made of thin aluminum tubing of the type used for making the pointers of electrical measuring instruments. These are riveted to a central washer, which is fastened about the central hub of the magnet system, and are further riveted to a card such as 32. It will be noted that the members 30 and the pivot member 34 contained therein are rather long. A purpose is served by this. It is desirable that the moving system have a great moment of inertia about a horizontal axis. This will aid in avoiding the effects of oscillation about the horizontal axis when the compass is shaken or otherwise disturbed. By making the members 24 and 30 respectively of elongated form, and especially by providing an enlarged portion such as shown at the terminus of element 30, inertia can be added for movement about horizontal axes passing through the pivot point. However, these masses will have relatively little moment of inertia about a vertical axis passing through the pivot member 24.

When the magnet system rotates, whether it be about a horizontal, vertical, or inclined axis, the tips thereof will pass close to the damping cup and will induce eddy currents therein. These will oppose the motion of the magnet and will tend to damp this motion. The four magnets acting simultaneously will be particularly effective. Furthermore, since the lines of force are concentrated or crowded in the vicinity of the tips of the magnet, the magnetic field which will pass through the damping cup will be intensified and will serve to make the damping more efficient. While magnet systems employing four poles have been described, other systems are possible and effective. Thus, a magnet system employing three north poles and three south poles, each projecting radially from a central hub, and spaced sixty degrees apart, will also operate and give good results. The number may further be increased to any even number of poles. Thus, eight poles or ten poles may also be utilized. However, it is found that the simplicity and efficiency of four poles and the symmetry of this arrangement make it highly desirable.

The type of symmetry utilized in the magnet system is one which may be best expressed by the terminology used in crystallography. It will be seen that if the magnetic element is held in its normal position, and is rotated at 90° about a vertical axis, the appearance will be the same as before. This process may be repeated four times before one has a complete revolution of the element. The type of symmetry may therefore be described as fourfold, similar to the description of symmetry of an octahedron rotated about its long axis. Further, the magnetic system may have a sixfold symmetry, in other words it may have prongs subtending angles of 60° at the center. Thus, each sixth of a revolution about the vertical axis will restore the appearance of the element to its original appearance. In a system having sixfold symmetry, three of the magnets would be polarized with north polarity, the opposite three having south polarity. An advantage of this type over the 90° form shown would be that it would behave in superior fashion when used with a compensating system. In general, the terminology of crystallography may be utilized to describe the properties of magnetic systems. It will be appreciated that the description of mechanical symmetry and magnetic symmetry will be different because of the different polarity of the members.

In the prior art, it had been usual to utilize compass magnets of either straight cylindrical form, or of the form of a flat sheet, tapered in one dimension only. In the present invention, advantage is taken of the superior results obtained by tapering the element in two dimensions. In other words, the prongs or the poles of the magnet are made in the form of pyramids, or better still, cones. The tapering in two dimensions has the great advantage of reducing the amount of surface area for a given volume of material, which further tends to reduce the leakage. This follows from the familiar fact that leakage depends upon the surface presented. At the same time, there is an additional improvement due to the lowering of the moment of inertia. By providing a form tapered in two dimensions, the moment of inertia is reduced to less than half of its figure as compared with what would be obtained for tapering in one dimension. In general, it may be said that a circular cross section and an approximately conical form is the most desirable. The more nearly the elements approach this form, the more efficient in general, they will be magnetically.

It is to be noted that the conical bottom 18 of the damping cup 19 serves an important function. Since it lies close to the magnets, currents will be induced in the said conical portion and this portion will further aid in damping the motion of the magnets. This effect will be most pronounced when the indicating member or card is displaced from its horizontal position, since at that time the prongs of the magnets will approach more closely to the conical bottom of the damping cup. This is a particularly valuable feature, since the damping is most likely to be necessary when a compass has been violently shaken and is displaced from its horizontal position. In effect, the damping cup so formed and the relation of the magnets thereto provides a system, the efficiency of damping of which is greater at times of violent motion than ordinarily. This is a highly desirable feature since theoretically the damping should be zero when the system is nearly at rest, and should be very high when the system is in violent motion. This condition is also aided by the general phenomena of electromagnetic damping, since electromagnetic damping is virtually non-existent at very low velocities, and increases as some higher power of velocity. It should be noted in this connection, that in the modification shown in Figure 14, since the prongs are relatively thin, the moment of inertia will not be as much affected by making them longer as would be the case with the other modifications. Advantage may be taken of this to make these prongs longer so that a given angular velocity will give a proportionally greater linear velocity at the tips of the magnet. This will increase the effectiveness of damping. Thus, if extremely good damping is desired, the prongs will be made very thin at the extremity to secure a low moment of inertia but would be made quite long to secure the high velocity required for most effective damping.

An examination of the form of the compass shown in Figure 2 particularly will reveal that an instrument of generally flattened form is provided. There are many cases where such a form is highly desirable, a usual one being where the compass is read from above by a helmsman. Furthermore, a compass having a spherical exterior would require a curved glass piece in place of the window 7. This is expensive to reproduce, is vulnerable to breakage, being in exposed position, and must be finished very carefully. Any irregularities will result in distortions and other features which are visually annoying. On the other hand, a window such as 7 can be cut out of plate glass at relatively low cost. The flattened form has been made possible by the use of the damping cup as shown, by the bending of the arms holding the card, and by the general methods of mounting the magnet and card. This has been done without sacrificing the desirable feature of having the supporting knife edges of the entire compass, the card, and the pivot all lie in one plane. Moreover, the parts as shown may be fabricated at relatively low cost as compared with the parts necessary in a spherical type of compass.

This application continues and extends the teachings in applicant's application, Serial No. 399,014, (Patent No. 2,350,402, issued June 6, 1944), further exemplified in applicant's co-pending application, Serial No. 506,748.

The scope of the invention is indicated by the appended claims.

We claim:

1. A magnetic element for orienting an indicating member in a ship compass and the like, consisting of at least two tapered portions, with their bases pointed toward each other and the reduced portions pointing away from the center of the members, the members further being tapered in two dimensions, so as to provide a minimum surface for magnetic leakage, and a reduced moment of inertia, thereby furnishing a magnetic system which has a high ratio of magnetic moment to moment of inertia.

2. A magnetic orienting element for use in ship compasses and the like, comprising a central hub portion, and radially projecting arms, the central hub portion being made of magnetic material of high coercive force, and relatively low permeability, the radially projecting arms being made of material of relatively high permeability, the projecting arms being of generally tapered form, with the larger end nearest the said hub portion, the area of the enlarged portion and the area of the reduced portion being substantially in the ratio of the permeability of the said permeable material to that of the material of high coercive force, the aforesaid combination providing a magnetic integer which has a minimum moment of inertia per unit of magnetic moment.

3. In a magnetic compass, a magnetic system including magnetic elements adapted to rotate about a point of support, a cup of conducting material surrounding the said magnetic elements and serving to damp the motion thereof, the damping cup being of generally flattened form, the magnetic elements being inclined downwardly, relative to the normal horizontal position of the moving system relative to the top of the said conducting cup, whereby the ends of the magnet will remain within the cup and be damped thereby, for lateral swings of the magnet system, the aforesaid construction serving to maintain the magnetic elements well within the damping cup for lateral swings of the magnetic system.

4. A magnetic orienting element for magnetic compasses and the like comprising a central hub portion of cup-shaped form, means within the cup-shaped portion providing for pivoting of the element, means for attachment of poles of material having different mechanical and magnetic properties, and pole pieces of different magnetic properties fastened to the last-named means, the pole pieces being each double tapered in form the said pole pieces being each in the form of individual bars of material, the aforesaid assemblage providing a pivoted unit having a high magnetic moment relative to moment of inertia.

5. In a magnetic compass, a moving magnetic system to orient an indicating element, a damping element, the said damping element being formed of highly conductive material with a spherically formed portion therein, having the center of the spherical portion at the point of support of the magnet system contained therein, further having a bottom conical portion, the magnet system being adapted to rotate relative to the said spherical portion so as to induce damping currents therein, and further to rotate relative to the bottom conical portion, so as to induce damping currents in the said portion, the sides of the said conical portion sloping downwardly from the point of support at the said magnet system, whereby the magnet system will rotate close to, but not touch the said conical portion for lateral swings of the said magnet system, thereby providing complete damping of the moving system without danger of contact therewith.

6. A magnetic orienting system for magnetic compasses and the like comprising a cup shaped member of generally polygonal form, made of highly permeable material, with pivot means mounted within the said cup shaped portion, a plurality of separate magnetic members, having a high coercive force relative to the material of the said cup, each member being attached to a respective one of the polygonal faces of the said cup member, so as to project radially relative to the center of the cup, the aforesaid combination providing a magnetic integer having a high ratio of magnetic moment to moment of inertia.

SHELLEY KRASNOW.
JOSEPH M. S. KAUFMAN.